Patented Jan. 22, 1924.

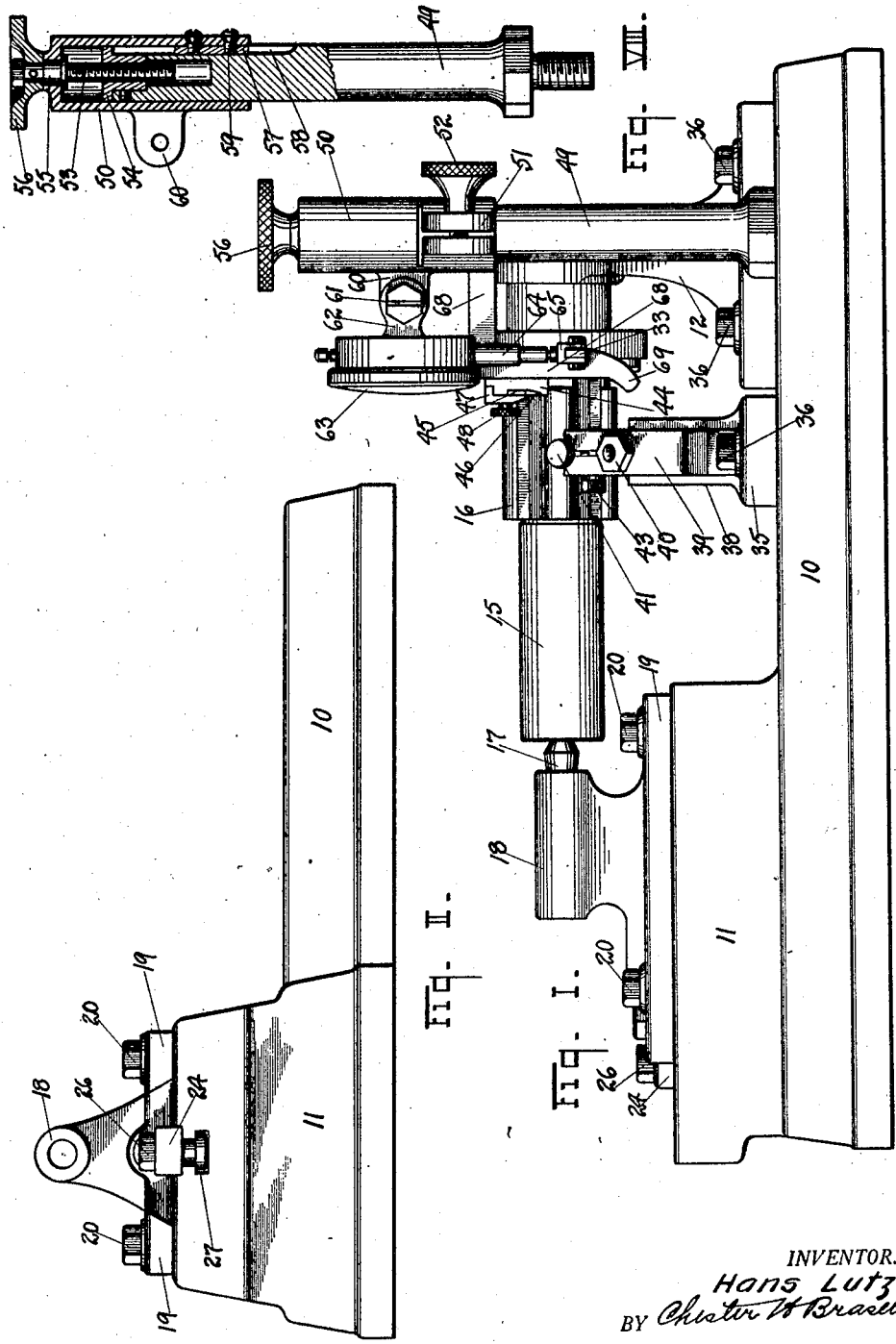

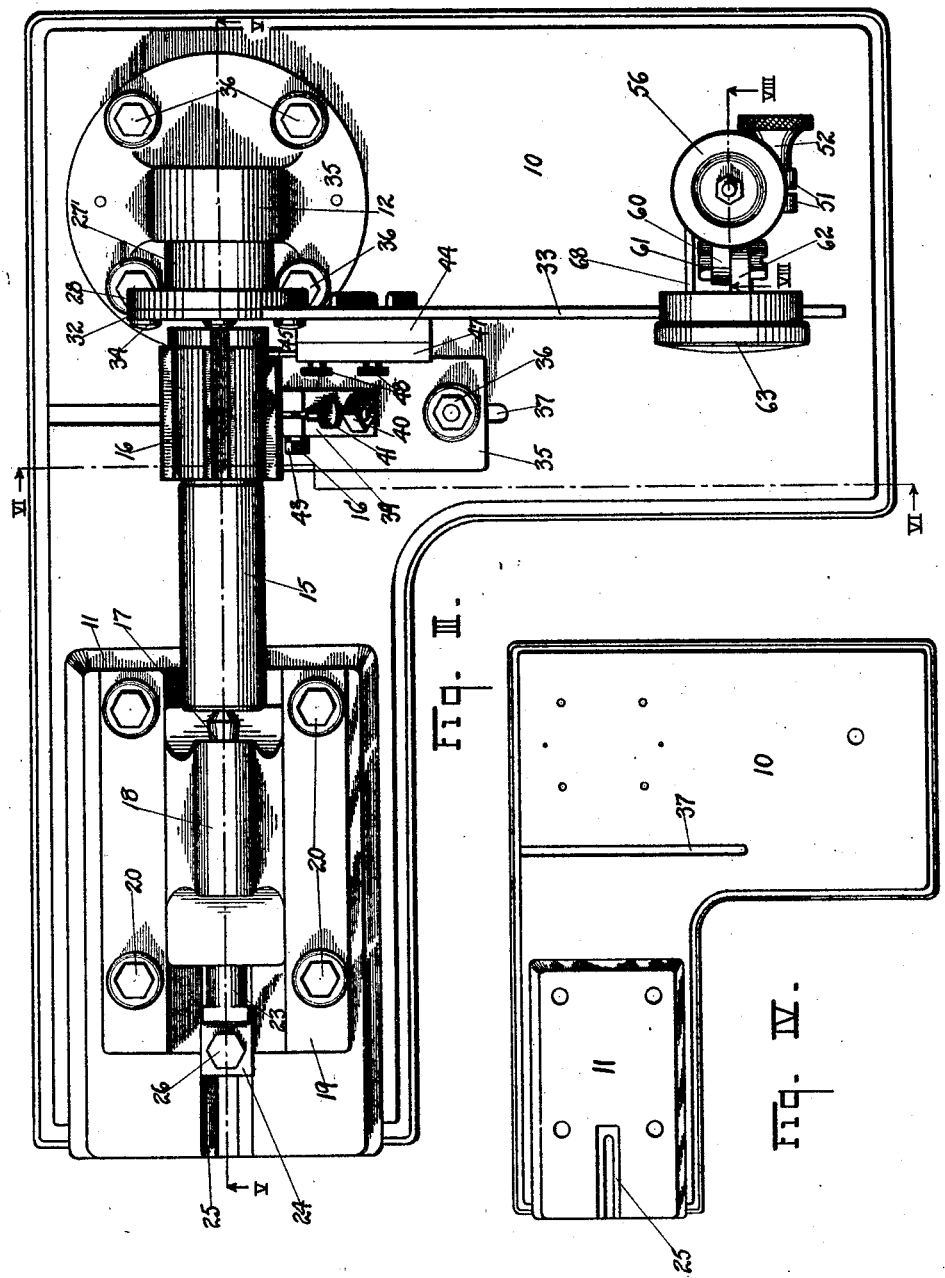

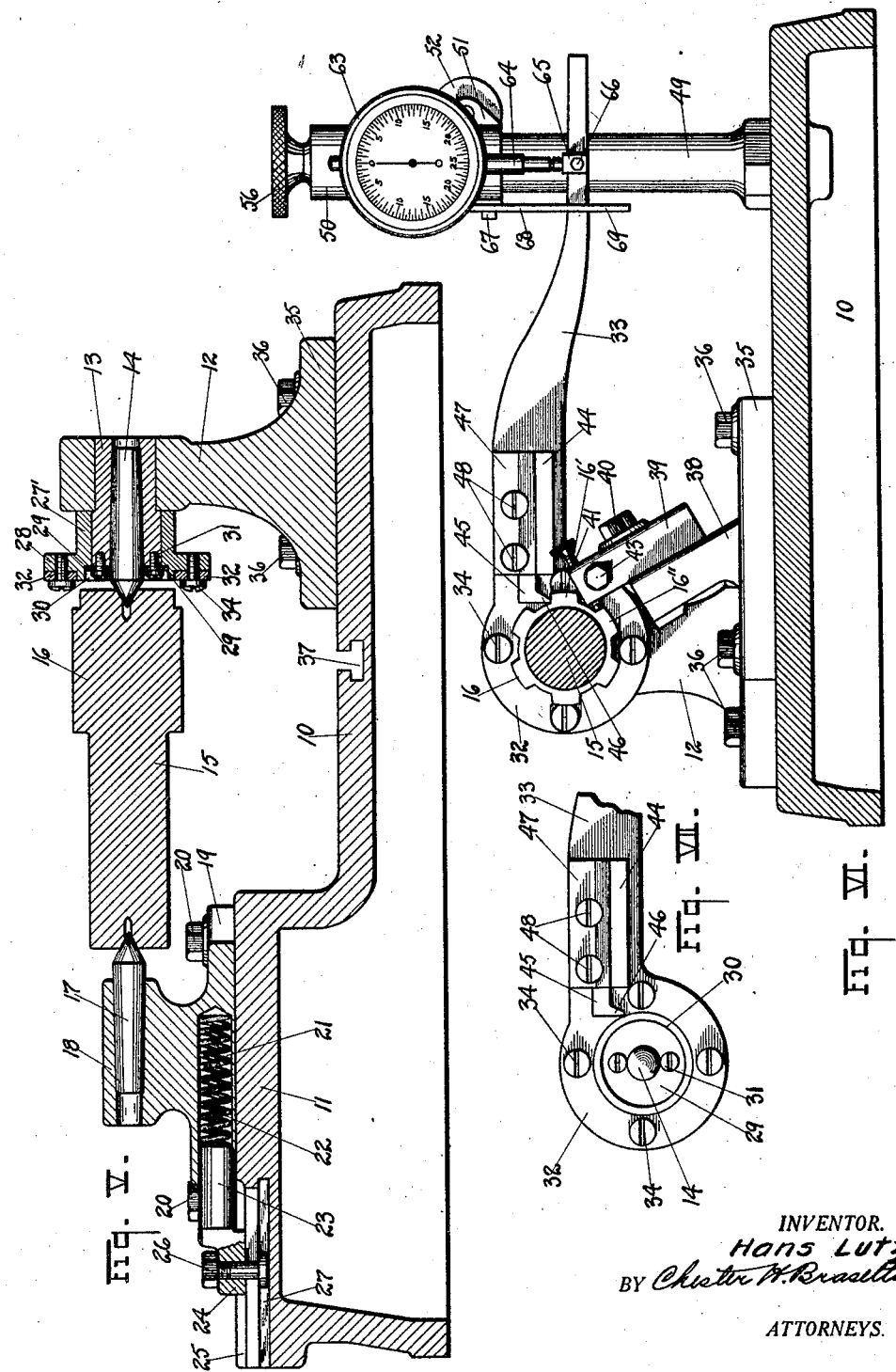

1,481,295

UNITED STATES PATENT OFFICE.

HANS LUTZ, OF ELMIRA, NEW YORK, ASSIGNOR TO THE WILLYS-MORROW COMPANY, OF ELMIRA, NEW YORK, A CORPORATION OF OHIO.

GAUGING MACHINE.

Application filed October 6, 1920. Serial No. 415,128.

*To all whom it may concern:*

Be it known that I, HANS LUTZ, residing at Elmira, county of Chemung, State of New York, have invented certain new and useful Improvements in Gauging Machines, of which I declare the following to be a full, clear, and exact description.

My invention relates to gauging machines and has for its object to provide improved means for testing tools or other objects having a series of splines or projections thereon, the accuracy of the spacing of which it is desired to test or determine.

A further object of the invention is to provide an improved gauging or testing machine for indicating whether or not the distances between certain predetermined points upon an object are equal to or greater or less than predetermined standards of measure.

A further object of the invention is to provide a testing device having a fixed member and a movable member associated with an indicator for indicating whether or not the distance between two points on an object is greater or less than a predetermined distance.

With these and other objects in view the invention comprises certain novel features of construction and arrangement of parts as will be hereinafter more fully pointed out and claimed, it being apparent to those skilled in the art that the invention shown and described herein is susceptible to various modifications and arrangements to suit special or varying conditions and I wish it to be understood that the terms which I have used are merely descriptive and not limiting and that it is my intention to include any and all modifications which fall within the scope of the invention as defined in the appended claims.

A construction constituting one embodiment of the invention is illustrated in the accompanying drawings of which:

Figure I is a side elevation of a machine embodying the invention.

Figure II is an end elevation of the same with certain parts omitted.

Figure III is a plan view of the machine shown in Figure I.

Figure IV is a detail plan of the bed or base upon which the indicating mechanism is mounted.

Figure V is a sectional elevation taken on line V–V of Figure III.

Figure VI is a transverse sectional elevation taken on line VI–VI of Figure III.

Figure VII is a detailed view of the inner end of the lever arm shown in Figure VI, and Figure VIII is a fragmentary sectional elevation taken on line VIII–VIII of Figure III, showing the means of supporting the indicator.

Like reference numerals refer to similar parts throughout the several views of the drawings.

The machine illustrated in the accompanying drawings comprises a base 10, provided at one end with a raised portion 11, the base being preferably of L-shaped construction as shown in Figure IV. Secured upon one end of the base is an upright 12, having a bearing member 13, mounted thereon into which is driven a tapered pin 14, upon the inner end of which is rotatively mounted the object 15 to be gauged or measured, which in the present instance constitutes a reaming tool provided with the splines or blades 16 upon one end thereof, the opposite end of the tool being supported by a tapered pin 17, driven into the slide 18 movable between the guides 19 disposed upon the raised portion 11, of the base and secured thereon by means of the bolts 20, as indicated in Figure III. The slide 18 is provided with a longitudinally extending recess 21, within which is held a spring 22 seated upon the end of an adjustable member 23, having a head 24 slidably mounted within a groove 25 formed upon the raised portion 11, of the base as shown in Figures III and V, said head being clamped in any desired position of adjustment by means of a bolt 26, the head of which is positioned within the undercut portion 27, of the groove as indicated in Figures II and V. The reamer 15 or other member to be gauged may be quickly inserted between and removed from the tapered ends of the pins 14 and 17, by moving the slide 18 outwardly against the action of the spring 21. When it is desired to measure or test a tool considerably greater in length than the one shown the bolt 26 is loosened and the member 23 is moved outwardly to permit outward movement of the slide the desired amount. Rotatably mounted upon the bearing 13, of the upright 12 is a sleeve 27' having an annular flange 28, as shown in Figure V. The sleeve 27' is held upon the bearing 13 by means of a plate 29 disposed within a recess 30 on the inner end of the sleeve 27'; the same being secured by means of the screws 31, which are threaded into the inner end of the bearing 13 as shown in Figure V. Secured upon the annular flange 28, of the sleeve 27 is the circular portion 32 of a lever 33, said circular portion being disposed upon the annular flange 28 and secured by means of the screws 34. Adjustably mounted upon the base 10, is a slide 35 which may be clamped in any desired position by the means of a bolt 36, the head of which is disposed in an undercut groove 37 formed in the base as shown in Figures III and V. The slide 35 is preferably provided with an inclined arm or projection 38 upon which is adjustably mounted a block 39 adapted to be clamped in any desired position upon the arm by means of a bolt 40. Through the upper end of the block 39 is threaded a screw 41, the end of the block being split to receive said screw which is held in the desired position by means of a clamping bolt 43, extending transversely through the split end of the block. Secured upon the lever 33, adjacent the inner end thereof is a plate 44, having a groove in its outer face to receive a bar 45 provided with a finger 46 at one end thereof, said bar being held in position upon the plate 44, by means of a clamping member 47, which is secured by means of the screws 48. The finger 46, is adapted to engage one of the splines or projections of the reamer 15 while the adjustable screw 41 is adapted to engage the next succeeding spline immediately beneath the one engaged by the finger as clearly shown in Figure VI, it being understood that the screw 41 is adjustable to vary the distance between the lower end thereof and the finger 46, to accommodate tools having splines or projections spaced at greater or lesser distances apart than shown in Figure VI. In other words, the distances between the two contact points, which engage the sides of the splines or projections may be varied at will.

Secured upon the base adjacent the outer end of the lever 33 is a post 49, provided at its upper end with a telescoping slide in the form of a sleeve 50, the lower end of the sleeve being split and having projections 51, through which extends a screw 52, for clamping the sleeve in any desired position upon the post. The sleeve is made adjustable upon the post by means of a feed screw 53 threaded through a block 54, anchored in a recess in the upper end of the post as shown in Figure VIII, said screw being swiveled in the outer end of the sleeve as indicated at 55, and provided with a knob 56 for turning the screw. The sleeve is prevented from turning upon the post by means of a key 57 held in the groove 58, by means of the screws 59. Projecting from the sleeve at one side thereof is a lug 60, upon which is clamped by means of a screw 61, the rearwardly extending arm 62 of the indicator 63. The indicator is provided with a downwardly extending stem 64, the lower end of which engages a member 65, secured upon the outer end of the lever 33, by means of a bolt 66, as shown in Figures I and VI. Secured upon the lower end of the sleeve 50 by means of a bolt 67 is a laterally extending arm 68, having a downwardly extending portion 69, provided at its lower end with a hooked portion adapted to form a guard for the lever to prevent the same from dropping below a determined point. The indicator may be of any preferred type, but preferably comprises a graduated dial with a pointer actuated by a spring, controlled by the stem 64, which when moved inwardly will cause the pointer to indicate the difference between the desired and actual distance between the sides of the adjacent splines or projections.

In the operation of the machine, bearing in mind that the indicator hand normally lies at a point to the left of the zero mark upon the dial, when the lever 33 lightly contacts with the stem 64, and assuming that the adjustable screw 41 has been set in the proper position, the reamer is applied in position to be supported by the pins 14 and 17, and is then turned by hand counter clockwise to the position shown in Figure VI, until the upper edge of the spline 16' comes in contact with the finger 46. Upon further turning of the reamer the outer end of the lever 33 will be raised, at which time the pointer will begin to move to the right and if it reaches the zero point on the dial at the same time that the upper end of the spline 16" comes in contact with the end of the pin 41 the operator will know that the splines are spaced apart the correct distance but if when the pointer moves to the zero position and the lower spline 16" has not yet come in contact with the pin 41 he will know that the distance between the splines is too great, while on the other hand if the lower spline 16" comes in contact with the end of the pin 41 before the pointer reaches the zero position, it will indicate that the distance between the splines is not great enough. The extent of the increase or decrease of the distance between the splines above or below the proper amount will be indicated by the number of graduations upon the dial between the indicator hand and the zero point, in one case at the time when the spline 16" comes in contact with the screw 41 before the spline 16' comes in contact with the finger 46, in the other case when the spline 16' comes in contact with the finger before the spline 16" comes in contact with the pin 41, the pointer in these two instances being on opposite sides of the zero point. In these cases the graduations between the pointer and the zero point will indicate on the one hand the increased distance between the splines, and on the other hand the decreased distance between the same. When the distance is less than the predetermined amount the pointer will show a "minus" reading and when the distance is greater than the predetermined amount it will show a "plus" reading. The indicator shown in the present instance is one which is provided with a rotating dial so that when the pointer is in the position it normally assumes the dial may be rotated to the right or left to shift the zero point the desired amount.

While I have illustrated and described one embodiment of my invention it will be obvious to those skilled in the art that other embodiments and modifications thereof may be constructed without departing from the spirit of the invention and I wish therefore not to be limited or restricted to the precise embodiment shown except in so far as the same is limited by the appended claims.

What I claim as new and desire to secure by Letters Patent is:

1. In a gauging machine, means adapted to rotatably support an object having projections thereon, means adapted to form a stop for one of said projections and means adapted when said object is rotated into engagement with said stop to indicate whether or not the distance between said projections is greater or less than a predetermined distance.

2. In a gauging machine, a base, means upon the base for supporting an object and permitting movement of the same thereon, means for limiting the movement of the object in one direction and means for indicating whether or not the distance between said limiting means and a predetermined point upon the object is greater or less than a predetermined standard of measure.

3. In a gauging machine, means for supporting an object to be gauged, means adapted to contact with the object at two different points and a gauge associated with a portion of said last mentioned means and having a graduated dial and pointer for indicating the difference between a predetermined standard of measure and the distance between said points.

4. In a gauging machine, means for supporting an object to be gauged having spaced projections thereon, a stop adapted to engage one of said projections, a movable member located in the path of another of said projections and means associated with said movable member for indicating the difference between a predetermined standard of measure and the distance between said projections.

5. In a gauging machine, means for supporting an object to be gauged having spaced projections thereon, a stop adapted to engage one of said projections, a rotatable arm, means upon the arm in the path of another of said projections and means controlled by said arm for indicating the difference between a predetermined standard of measure and the distance between said projections.

6. In a gauging machine, means for supporting an object to be gauged having spaced projections thereon, a stop adapted to engage one of said projections, a rotatable arm, means upon the arm in position to be engaged by another of said projections and an indicator having a graduated dial and a pointer controlled by said arm for indicating the difference between a predetermined standard of measure and the distance between said projections.

7. In a gauging machine, a base, means thereon for supporting an object to be gauged, means adapted to contact with the object at two different points, an adjustable slide carried by said base and held rigid with respect thereto, and an indicator carried by said slide and controlled by a portion of said contacting means to indicate the difference between a predetermined standard of measure and the distance between said points.

8. In a gauging machine, a base, means thereon for supporting an object having spaced projections, means adapted to contact with said projections, a slide adjustable upon the base and an indicator carried by said slide and controlled by a portion of said contacting means to indicate the difference between a predetermined standard of measure and the distance between said projections.

9. In a gauging machine, a base, means thereon for supporting an object having spaced projections, a stop adapted to engage one of said projections, a rotatable arm, means upon the arm in the path of another of said projections, a slide adjustable upon the base and an indicator carried by said slide and controlled by said arm to indicate the difference between a predetermined standard of measure and the distance between said projections.

10. In a gauging machine, a base, means thereon for supporting an object having spaced projections, a stop adapted to engage one of said projections, a rotatable member, means upon the member disposed on the path of another of said projections, a slide adjustable upon the base, an indicator carried by said slide and controlled by said rotatable member to indicate the difference between a predetermined standard of measure and the distance between said projections and a guard for limiting the movement of said rotatable member.

11. In a gauging machine, a base, means thereon for supporting an object having spaced projections, a stop adapted to engage one of said projections, a rotatable member, means upon the member in the path of another of said projections, a post secured upon said base, a sleeve mounted to slide upon the post, a feed screw projecting into the post and adapted to actuate said sleeve and an indicator carried by the sleeve and controlled by said rotatable member to indicate the difference between a predetermined standard of measure and the distance between said projections.

12. In a gauging machine, a base, means thereon for supporting an object having spaced projections, a slide upon the base, an adjustable screw carried by said slide adapted to engage one of said projections, a rotatably mounted member, means thereon disposed in the path of another of said projections and means controlled by said rotatable member to indicate the difference between a predetermined standard of measure and the distance between said projections.

13. In a gauging machine, a base, means thereon for supporting an object having spaced projections, a stop adapted to engage one of said projections, a rotatable arm, an adjustable finger upon said arm in the path of another of said projections and means controlled by said arm for indicating whether or not the distance between said projections is greater or less than a predetermined distance.

14. In a gauging machine, a base, an upright thereon, a bearing carried by said upright, a slide upon the base, means carried by said slide and said bearing for supporting an object to be gauged having spaced projections thereon, a stop upon the base adapted to engage one of said projections, an arm rotatably mounted upon said bearing, a member upon said arm disposed in the path of another of said projections and an indicator controlled by said arm for indicating whether or not the distance between said projections is greater or less than a predetermined distance.

15. In a gauging machine, a base, a bearing supported by the base, a pin carried by said bearing, means upon the base co-operating with said pin to rotatably support a member having a plurality of splines thereon, a stop upon the base adapted to engage one of said splines, an arm rotatably mounted upon said bearing, a member upon said arm disposed in the path of another of said splines and means controlled by said arm for indicating whether or not the distance between said splines is equal to a predetermined standard of measure.

16. In a gauging machine, a base, a bearing supported by the base, a pin carried by said bearing, spring-pressed means upon the base co-operating with said pin to rotatably support a member having a plurality of splines thereon, a stop upon the base adapted to engage one of said splines, an arm rotatably mounted upon said bearing, a member upon said arm disposed in the path of another of said splines and an indicator having a graduated dial and a pointer controlled by said arm for indicating whether or not the distance between said splines is equal to a predetermined standard of measure.

17. In a gauging machine, spaced means including a spring-pressed member for engaging the opposite ends of a splined member, a stop adapted to engage one of the splines of said member, a movable member disposed in the path of another of said splines and means controlled by said movable member for indicating whether or not the distance between said splines is equal to a predetermined standard of measure.

18. A device for determining the spacing of the splines of a reamer comprising a stop means for engaging one of said splines and a micrometer means for operatively engaging an adjacent spline.

19. A device for determining the angular distance between corresponding faces of adjacent splines of a reamer comprising means for holding said reamer rotatable on its axis, a stop positioned to engage a face of one spline and a micrometer device operatively connected with the corresponding face of an adjacent spline.

20. In a gauging machine, a support for the object to be gauged, having a longitudinally disposed axis, spaced contact members for engaging the object, a holder for one of said contact members rotatable about the axis of the support, and an indicator operatively connected with said holder and adapted to indicate the relative positions of the contact members.

In testimony whereof I affix my signature.

HANS LUTZ.